March 17, 1970 F. A. MEEKINGS 3,500,641
PRESSURE INTENSIFYING DEVICES
Filed May 8, 1968 3 Sheets-Sheet 3

INVENTOR
FRANCIS ALBERT MEEKINGS
BY Ostrolenk, Faber,
Gerb & Soffen
ATTORNEYS 3,500,641
PRESSURE INTENSIFYING DEVICES
Francis A. Meekings, London, England, assignor to Spencer Franklin Limited, London, England
Filed May 8, 1968, Ser. No. 727,399
Int. Cl. F15b 7/08; F01b 29/04; F16j 15/18
U.S. Cl. 60—54.6                    10 Claims

ABSTRACT OF THE DISCLOSURE

A pressure intensifying device for a fluid system comprises a pneumatic cylinder 11 having a piston 16 therein provided with a detachable plunger 27 which projects through the front closure member 22 of the pneumatic cylinder into a smaller diameter hydraulic cylinder 12. The plunger 27 enters the hydraulic cylinder 12 through a removable bearing bush or capsule 33 and the hydraulic cylinder 12 is detachable so that the bearing bush can be changed for different size plungers to vary the pressure intensification ratio.

---

This invention relates to pressure intensifying devices for use in fluid systems, but which are more particularly intended for operating one or more clamping tools in a fluid-actuated clamping system. Although the invention will be described in relation to such fluid-actuated clamping systems it will, however, be understood that the pressure intensifying device is not intended exclusively for use with such a system, but may be used generally in any fluid actuated control system.

Fluid actuated clamping systems have been proposed in which the clamping tools are hydraulically operated by a pressure intensifying device, the operation of which is controlled pneumatically by the operator. In its most simple form the pressure intensifying device comprises a first cylinder containing a pneumatically operated piston provided with a piston rod or plunger which extends through the head of the cylinder into a second cylinder of smaller diameter connected with the first cylinder. The second cylinder contains hydraulic fluid which is displaceable under greater pressure by the piston rod or plunger to operate the clamping tools.

The pressure intensification ratio obtained for a given pneumatic operating pressure is proportional to the ratio of the areas of the pneumatically operated piston and the hydraulic piston or plunger. Hithertofore, in order to vary the pressure intensification ratio of an existing device, it has been necessary to change both the piston or plunger together with the hydraulic cylinder.

The object of the present invention is to avoid these disadvantages by the provision of an improved construction which permits the pressure intensification ratio to be varied without the necessity for changing in any way the second hydraulic cylinder.

According to the invention a pressure intensifying device for a fluid system comprises a first cylinder adapted for connection to a pneumatic pressure supply, a pneumatic piston located in said first cylinder, a piston rod or plunger connected with the said piston and extending through the head of the cylinder, and a second hydraulic cylinder having a diameter less than that of the first pneumatic cylinder, said hydraulic cylinder being connected to the pneumatic cylinder for receiving the said piston rod or plunger therein, and said hydraulic cylinder being adapted for connection to a fluid actuated operating system, wherein the said piston rod or plunger enters the said hydraulic cylinder through a removable bearing bush or capsule provided with sealing means so as to isolate the said pneumatic cylinder from the said hydraulic cylinder.

The construction as described above provides a removable member which may be located within the head of the pneumatic cylinder or in the base of the hydraulic cylinder and which can be replaced as desired to suit a particular size of piston rod or plunger fitted to the pneumatic piston. In this way changes in the pressure intensification ratio can be quickly obtained without the necessity of removing or changing the hydraulic cylinder so that a single size hydraulic cylinder can be used irrespective of the pressure intensification ratio required.

The invention will now be described by way of example with reference to the accompanying drawings, in which.

Figure 1:
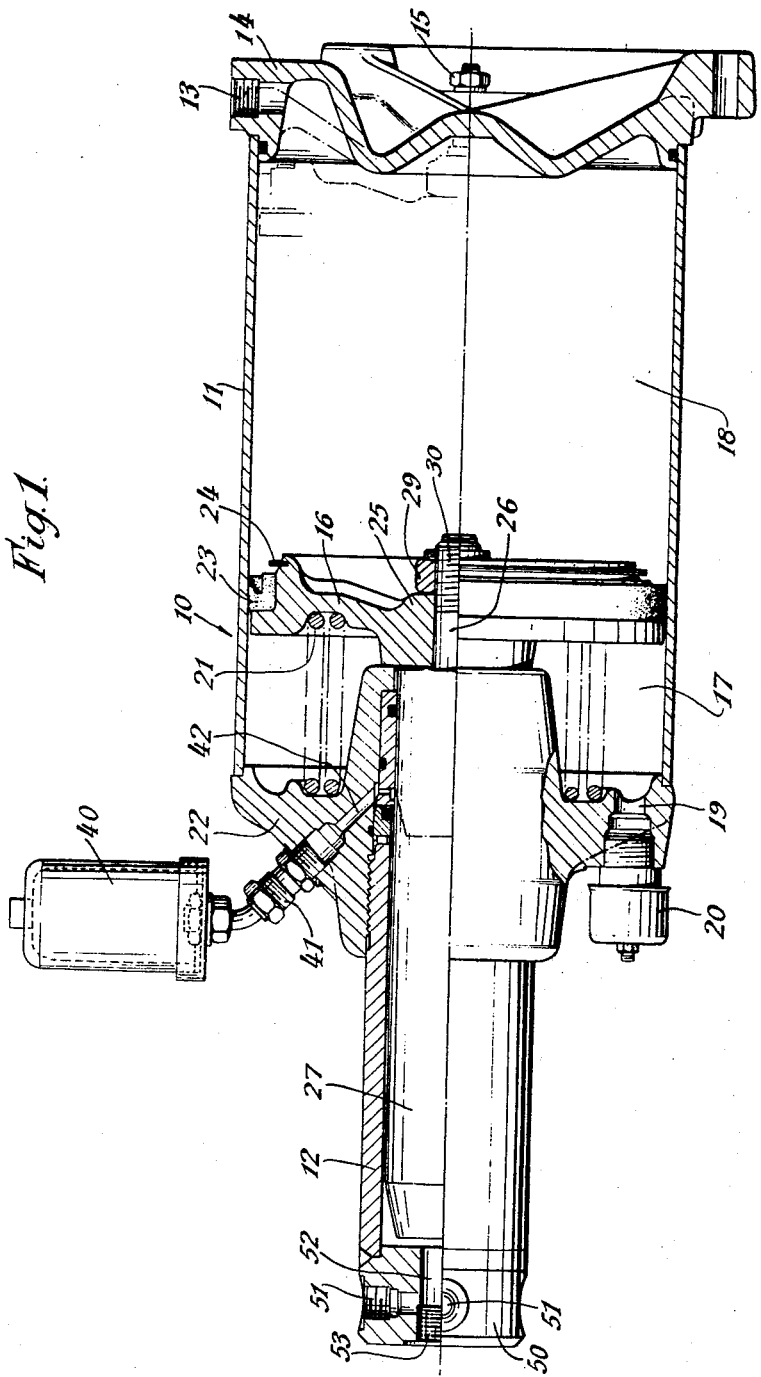
FIGURE 1 is a sectional side elevation of a pressure intensifying device in accordance with the invention for use in a fluid system.

Referring to the drawings and in particular to FIGURE 1 there is shown a pressure intensifying device 10 which is intended for use in a fluid system, such as a fluid-actuated clamping system.

The pressure intensifying device 10 comprises two cylinders 11 and 12 which are interconnected and which are of different cross-sectional area.

The larger cylinder 11 is connected to an air pressure supply (not shown) through a port 13 in the base 14 which is connected to the cylinder casing by a series of connecting members 15 positioned peripherally around the base member.

An air piston 16 is located in the air cylinder 11 dividing the cylinder into two variable chambers 17 and 18. The front chamber 17 is connected to the atmosphere by a port 19 through an air filter 20 and has a return spring 21 positioned therein for urging the piston 16 rearwardly towards the base 14. The spring 21 seats on a housing 22 which provides a front closure member for cylinder 11 and a support for the booster or smaller cylinder 12 as will be hereinafter described.

The air piston 16 is movable to the left as shown in FIGURE 1 against the action of the spring 21 by air pressure supplied to chamber 18 under the control of the operator. The air piston 16 is provided with the usual peripheral seal member 23 and a seal retainer 24.

The piston 16 is preferably an aluminium casting and has its central boss 25 bored to receive a rod portion 26 of reduced diameter extending from a piston rod or plunger 27 located in the smaller cylinder 12 which contains a hydraulic fluid, such as oil.

Figure 2:
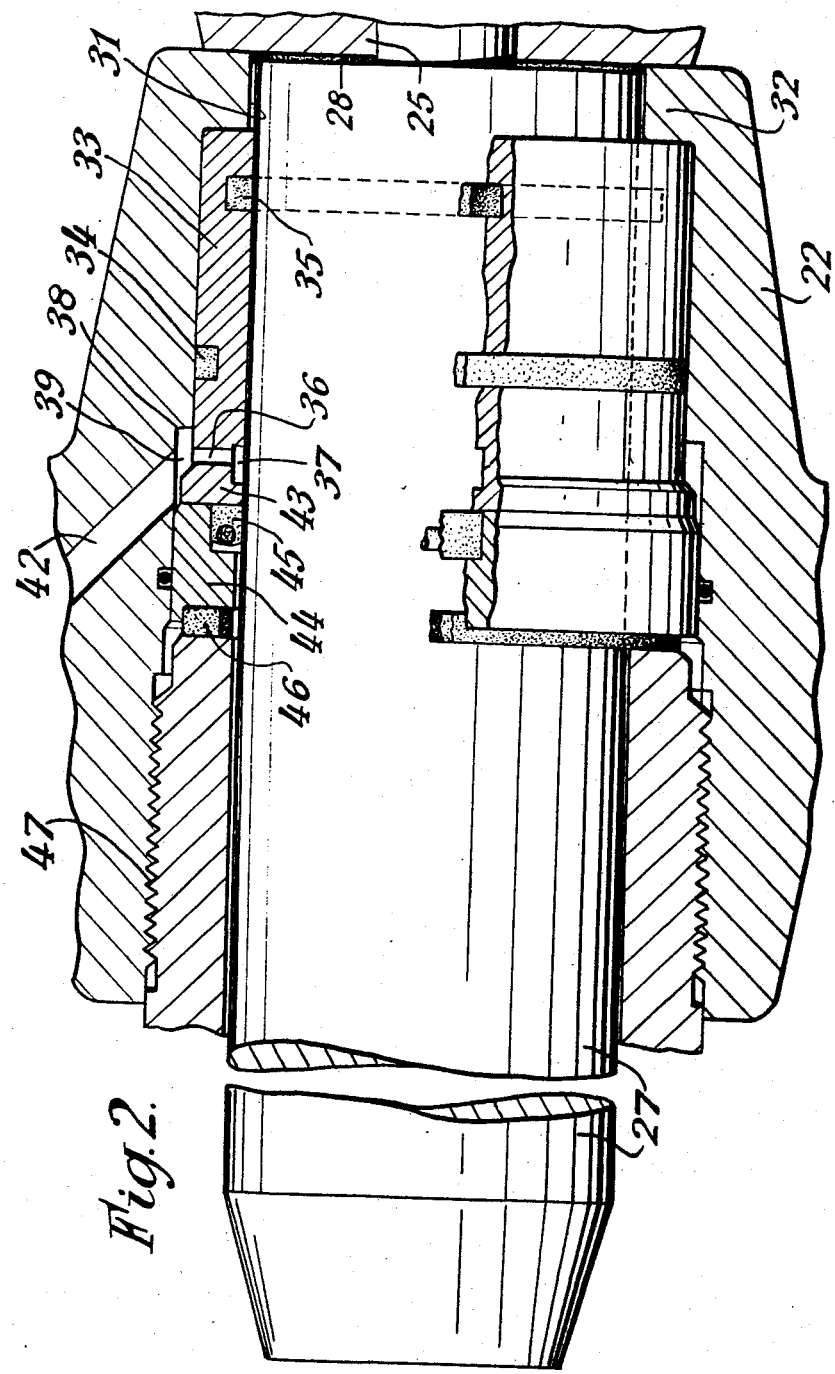
FIGURE 2 is an enlarged sectional view of part of the hydraulic cylinder showing a removable bearing member as used with a piston rod or plunger having a diameter approximating to that of the hydraulic cylinder.

As shown more clearly in FIGURE 2 the piston rod 27 abuts the central boss 25 of the piston 16 through the intermediary of a sealing washer 28 and the piston rod 27 is held in this position connected to the air piston 16 by means of a locking nut 29 (FIGURE 1) threadably engaging the threaded portion 30 on piston rod extension 26.

The piston rod 27 enters the hydraulic cylinder through an aperture 31 in an annular portion 32 of the housing 22. The diameter of the aperture 31 conforms to that of the cylinder 12 and has a cross-sectional area to suit the largest diameter piston rod or plunger 27 to be used.

The housing 22 is bored so that the annular portion 32 provides a seat for a removable bearing bush or capsule member 33, which is preferably made of Phosphor-bronze and is machined to a diameter for slidably receiving a particular piston rod or plunger.

The bearing bush 33 is provided with O-sealing rings 4, 35 on its outer and inner surfaces and it is also provided with a radial port 36 communicating with an annular pasage 37 on its inner surface.

The bore in the housing 22 is stepped at 38 to provide front portion 39 of larger diameter. A hydraulic reservoir or bottle 40 (FIGURE 1) is connected by an adaptor 1 to the housing 22 for maintaining the hydraulic fluid in the system. The reservoir 40 connects with enlarged bore 39 through a passage 42 in housing 22 and fluid is able to pass into cylinder 12 as required through port 36 and passage 37 when piston rod 27 is retracted in its inoperative position as shown in chain lines in FIGURE 1.

The front end 43 of bearing bush 33 is located in the enlarged bore 39 of housing 22 and is itself enlarged to provide an axial end face abutted by a gland housing 44. The gland housing 44 incorporates an inner end seal 45 engaging the bearing bush 33 and piston rod 27. The gland housing 44 also includes a front end seal 46 which is engaged by the end of the cylinder casing 12 which is threadably engaged in the housing 22 at 47 so that the bearing bush 33 is retained in position in the bore of the housing as the cylinder 12 is tightened up.

The front end of the cylinder casing 12 is completed by an outlet manifold member 50 (FIGURE 1) which is welded to the end of the cylinder casing and is provided with one or more outlet ports 51 which extend radially from a central bore 52 closed at its end by threaded plug 53. The outlet ports are connected in a fluid system e.g. for hydraulically operating clamping tools.

In the assembly of the unit as described above a particular diameter piston rod 27 and matching diameter bearing bush 33 and gland housing 44 are selected. The parts are then assembled in the housing 22 with the piston rod extension 26 located through the aperture 31. The threaded extension 26 is then positioned through piston 16 and locked by nut 29. The air cylinder is now assembled by attaching the base 14 and finally the hydraulic cylinder 12 is fitted by screwing the cylinder into housing 22 until it tightly engages seal 46.

In FIGURE 2 the device is shown using the maximum size piston rod 27 which thus produces the smallest pressure intensification ratio.

Figure 3:
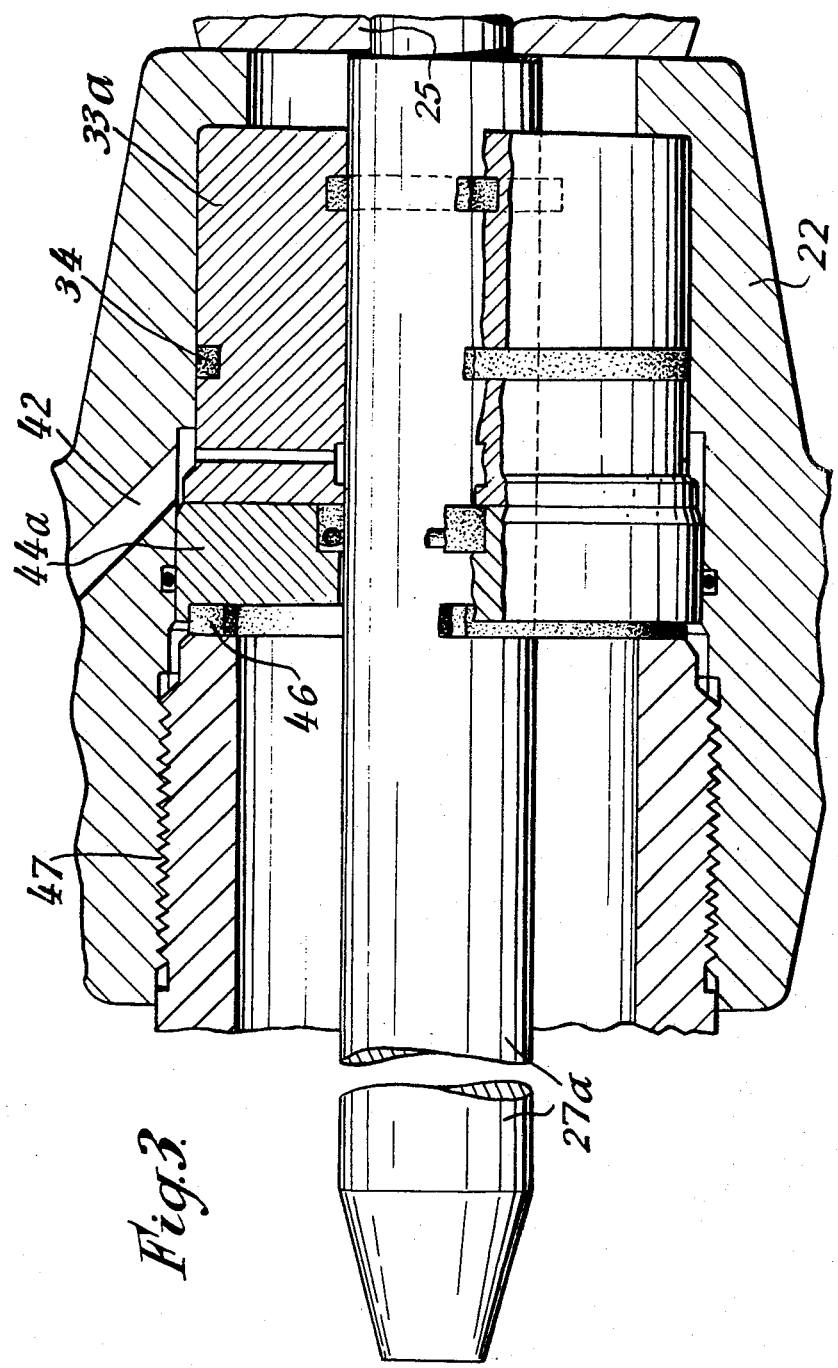
FIGURE 3 is an enlarged sectional view similar to FIGURE 2 but showing a modified arrangement using a smaller diameter piston rod or plunger.

If greater pressure intensification ratios are required a smaller diameter piston rod 27a is mounted in the unit as shown in FIGURE 3 with a correspondingly smaller diameter bearing bush 33a and gland housing 44a. In order to adapt the device for a different pressure intensification ratio it is only necessary to remove the hydraulic cylinder 12 and the base 14 to dismantle the piston rod and its matching bearing bush and gland housing. A new diameter piston rod and matching bearing bush and gland housing are then fitted and the device reassembled.

The invention therefore provides a simple construction for varying the pressure intensification ratio without in any way changing the hydraulic cylinder so that the device can be manufactured with a single size hydraulic cylinder.

I claim:

1. A pressure intensifying device for a fluid system, which device comprises a first cylinder adapted for connection to a pneumatic pressure supply, a pneumatic piston located in said first cylinder, a piston rod or plunger connected with the said piston and extending through the head of the cylinder, and a second hydraulic cylinder having a diameter less than that of the first pneumatic cylinder, said hydraulic cylinder being connected to the pneumatic cylinder for receiving the said piston rod or plunger therein, and said hydraulic cylinder being adapted for connection to a fluid actuated operating system, wherein the said piston rod or plunger enters the said hydraulic cylinder through a removable bearing bush or capsule which is provided with sealing means so as to isolate the said pneumatic cylinder from the said hydraulic cylinder, and wherein the hydraulic cylinder is detachably mounted in the head of said pneumatic cylinder and is adjustable to retain the bearing bush or capsule therein.

2. A device as claimed in claim 1, wherein a gland housing is located in the head of the pneumatic cylinder between the hydraulic cylinder and the bearing bush or capsule.

3. A device as claimed in claim 1, wherein the piston rod or plunger abuts the pneumatic piston and is formed with a portion of reduced diameter which extends through the pneumatic piston and which is threadably engaged by a nut for detachably connecting the piston rod to said piston.

4. A device as claimed in claim 1 in which the head of the pneumatic cylinder forms a housing for the removable bearing bush or capsule and a support for the hydraulic cylinder.

5. A device as claimed in claim 4, wherein said housing includes a bore which is in communication with a reservoir for supplying hydraulic fluid to the hydrauic cylinder through a radial passageway formed in the bearing bush or capsule.

6. A method of changing the pressure intensification ratio and fluid displacement of a pressure intensifying device as claimed in claim 2, which method includes the steps of removing and changing the hydraulic piston or plunger and the bearing bush or capsule together with the gland housing, if fitted.

7. A device as claimed in claim 2, wherein said piston rod, said bearing bush, and said gland housing are of substantially matching diameter.

8. A pressure intensifying device for a fluid system, which device comprises a pneumatic cylinder adapted for connection to a pneumatic pressure supply and a hydraulic cylinler having a diameter less than that of said pneumatic cylinder and adapted for connection to a hydraulically actuated operating system, said device being characterized in that the pneumatic piston in said pneumatic cylinder is provided with a detachable plunger which extends through the head of the pneumatic cylinder into said hydraulic cylinder, and in that said plunger is slidably supported in said hydraulic cylinder by a removable bearing bush so that the pressure intensification ratio for a given pneumatic operating pressure can be varied by changing the plunger and said bearing bush, said removable bearing bush at one end fitting within and abutting the head of said pneumatic cylinder and being detachably secured in position against said head by the hydraulic cylinder one end of which threadably engages said head to abut the other end of said bearing bush.

9. A device as claimed in claim 8, wherein a gland housing is also located in the head of the pneumatic cylinder between said one end of the hydraulic cylinder and the bearing bush.

10. A device as claimed in claim 8 in which the bearing bush is provided with sealing means on its outer and inner surfaces for isolating the pneumatic cylinder from the hydraulic cylinder.

References Cited

UNITED STATES PATENTS 1,768,799 7/1930 Stanley _____ 92—59
2,580,353 12/1951 Hunt.
2,827,766 3/1958 Hufford.

MARTIN P. SCHWADRON, Primary Examiner

R. R. BUNEVICH, Assistant Examiner

U.S. Cl. X.R.

60—54.5; 92—59, 128, 168